United States Patent [19]
Krueger

[11] Patent Number: 5,890,329
[45] Date of Patent: Apr. 6, 1999

[54] REMOVABLE MODULAR SECURITY ENCLOSURE FOR PRISONER TRANSPORT VEHICLES

[75] Inventor: Todd Krueger, Lillington, N.C.

[73] Assignee: Bob Barker Co., Inc., Fuquay-Varina, N.C.

[21] Appl. No.: 753,176

[22] Filed: Nov. 20, 1996

[51] Int. Cl.[6] .................................. E04H 3/08; B60B 3/00
[52] U.S. Cl. ........................... 52/106; 52/79.8; 296/24.1; 296/164; 119/453; 119/473
[58] Field of Search ................... 52/106, 67, 79.7, 52/79.8, 79.12; 296/24.1, 26, 27, 35.3, 164, 165, 171; 119/453, 472, 473, 496

[56] References Cited

U.S. PATENT DOCUMENTS

| | | | |
|---|---|---|---|
| 2,219,412 | 10/1940 | Dean | 52/106 X |
| 4,159,141 | 6/1979 | Dirck | 296/24.1 |
| 4,470,228 | 9/1984 | Dirck | 52/106 |
| 5,080,416 | 1/1992 | Dirck | 52/106 X |

*Primary Examiner*—Carl D. Friedman
*Assistant Examiner*—Yvonne Horton-Richardson
*Attorney, Agent, or Firm*—Rhodes, Coates & Bennett, L.L.P.

[57] ABSTRACT

The present invention entails a removable modular security enclosure for the internal cargo area of prisoner transport vans where each compartment within the security enclosure is defined by an interconnection of four walls and a roof panel. Any of the components defining the enclosure may be comprised of multiple interconnected sections. Sections and components of the enclosure are interconnected by such means as fasteners or interlocking devices. The walls of the enclosure are connected to the floor of the van where said floor serves as the floor of the enclosure. Access to a compartment is provided by a securable port in one of the defining walls. Benches may be provided along the walls inside the enclosure. When the security enclosure is composed of two separate compartments, a common wall may be used where the two compartments are in contact. Any compartment may also be provided with an adjustable vertical partition for dividing the compartment into two smaller subcompartments. A locking device between the partition and another component of the compartment serves to fix the position of the partition. A partition or any of the components defining a compartment may be constructed to allow at least partial translucency into or between compartments.

15 Claims, 13 Drawing Sheets

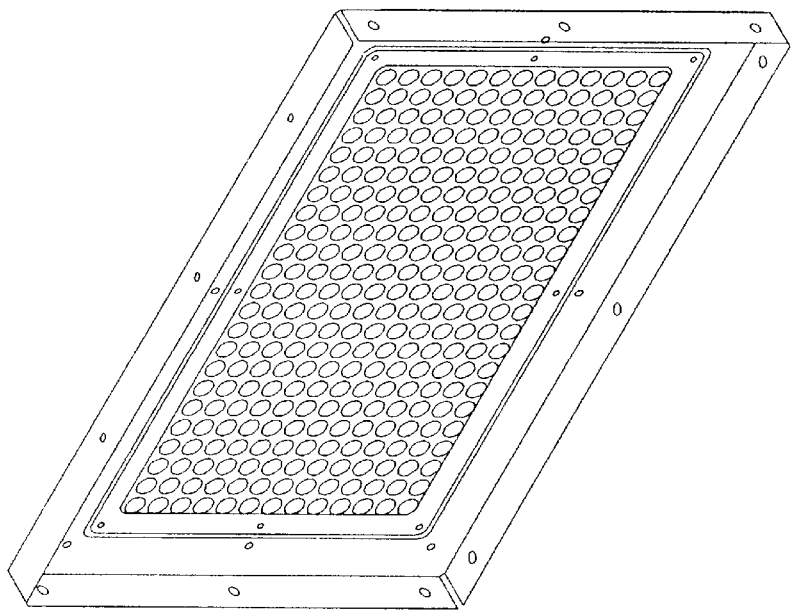
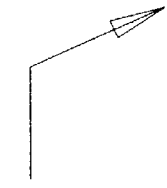
FIG. 13

REMOVABLE MODULAR SECURITY ENCLOSURE FOR PRISONER TRANSPORT VEHICLES

FIELD OF THE INVENTION

The present invention relates to security enclosures and more particularly to non-permanently installed modular security enclosures for internal cargo areas of passenger vans used to transport prisoners.

BACKGROUND OF THE INVENTION

Transportation of prisoners naturally evokes concerns of security in the means of transportation used for the purpose. One means of prisoner transport is by road-going vehicles. Such vehicles are available on the market, specifically designed and built with the necessary security infrastructure for the purpose of transporting prisoners. However, these specialty vehicles are often very expensive.

An alternate and commonly used option is to modify the internal cargo area of a conventional passenger van with a security enclosure. However, the components of said security enclosure are often welded together and/or welded to the structure of the van itself, thus forming a permanent fixture. If the modified van is involved in an accident or reaches the limit of its useful service life, the replacement van cannot use the old security enclosure, but must be modified with an entirely new and different security enclosure at an additional cost.

It is advantageous to have a security enclosure for prisoner transport vans that is not permanently attached to the structure of the van and that is also designed to facilitate ease of assembly and disassembly within the confines of the cargo area of the van. In the event of an accident or retirement of a vehicle, the security enclosure can simply be disassembled and moved to a new vehicle. Further advantage is gained if different makes and models of vans may be equipped with the security enclosure with only minimal modifications to the components. This advantage may be facilitated by the use of sectional construction of components, whereby only a section of component may need to be modified instead of the entire component.

SUMMARY OF THE INVENTION

The present invention relates to a removable modular security enclosure for the internal cargo area of passenger vans used for transportation of prisoners. Each compartment within the security enclosure is defined by an interconnection of four walls and a roof panel. In order to facilitate ease of assembly and disassembly within the cargo area of the van, any of the components defining the enclosure may be comprised of multiple interconnected sections. Sections and components of the enclosure are interconnected by such means as fasteners or interlocking devices. The walls are connected to the floor of the van and, thus, the floor of the van comprises the floor of the compartment. Access to a compartment is provided by a securable port in one of the defining walls. Benches may be provided along the walls inside the enclosure for prisoner seating.

When the security enclosure is composed of two separate compartments, a common wall may be used where the two compartments are in contact. In addition, any compartment may also be provided with a partition for dividing the compartment into two smaller subcompartments. A locking device acts between the partition and another component of the compartment to fix the position of the partition. Further, a partition or any of the components defining a compartment may be constructed to allow at least partial translucency into or between compartments for surveillance of the occupants. The compartments of the security enclosure may also be kept under surveillance by the driver of the van by means of a close-circuit video surveillance system. The surveillance system can also be used to allow the driver to monitor the area behind the rear of the van where direct visibility is lacking.

These and other objects of the present invention are or will become apparent from the description provided herein.

BRIEF DESCRIPTION OF THE DRAWINGS

FIG. 13 is a perspective view of an escape panel between the forward and rearward compartments.

DETAILED DESCRIPTION OF THE INVENTION

Figure 1:
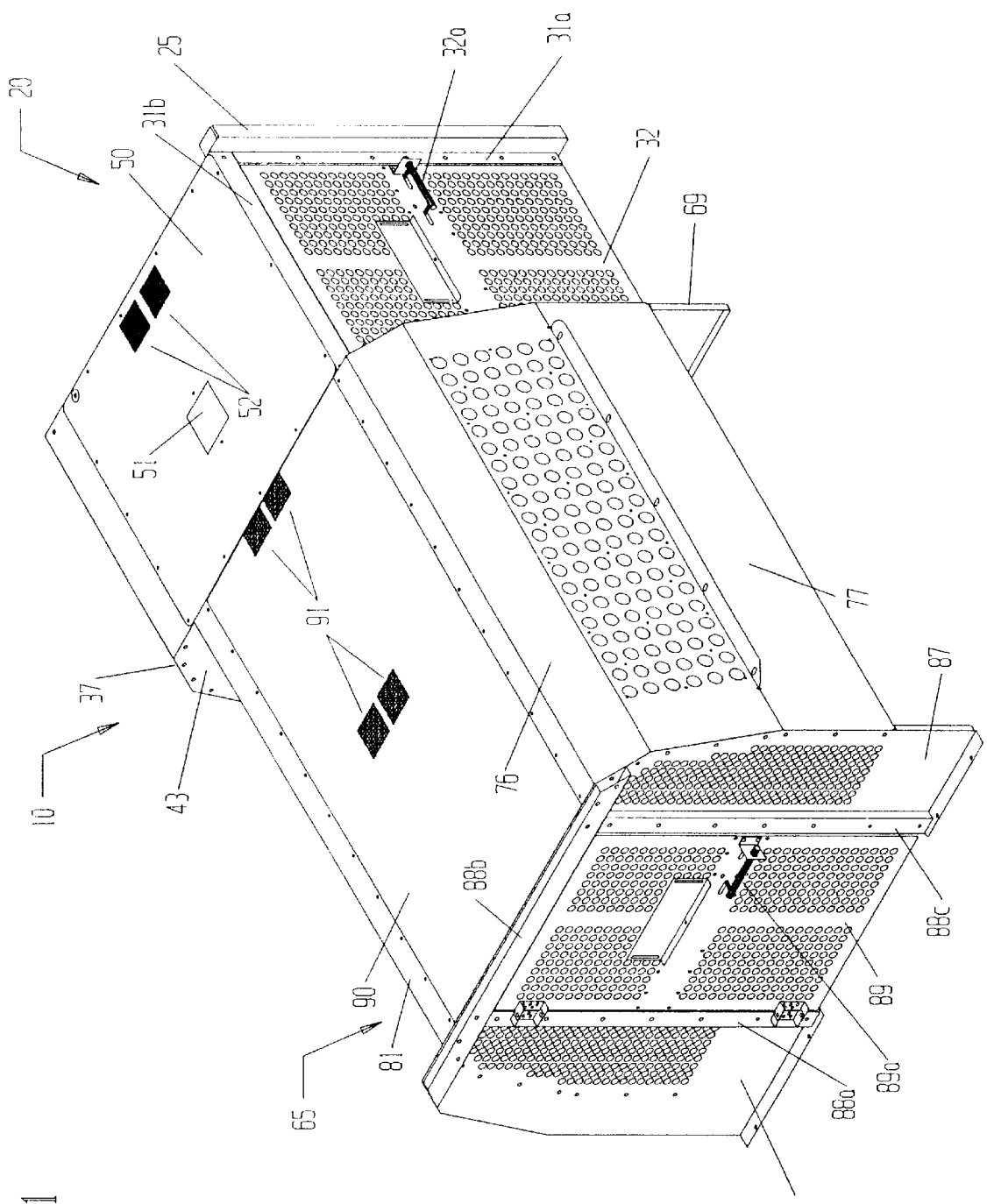
FIG. 1 is a perspective view of the two-compartment modular security enclosure of the present invention.
Figure 2:
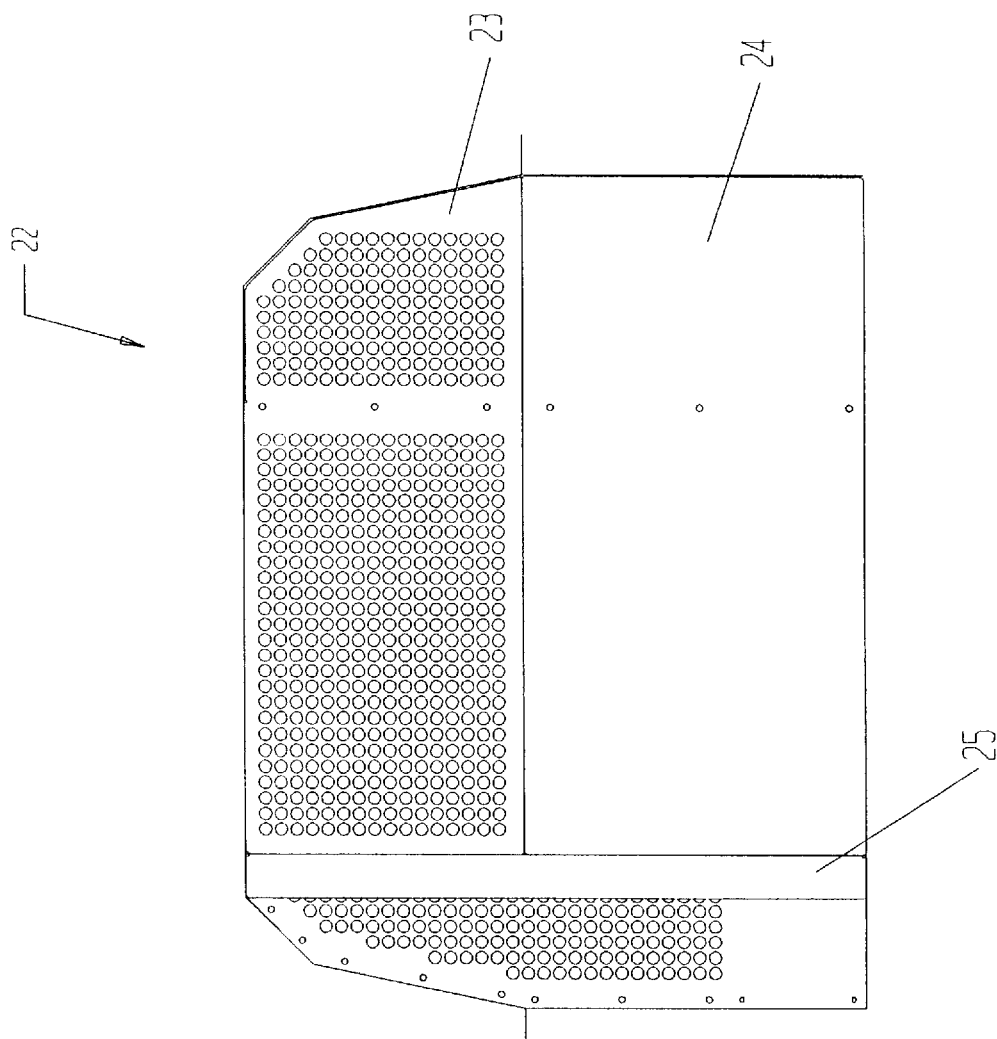
FIG. 2 is a front elevation view of the two-compartment modular security enclosure.
Figure 3:
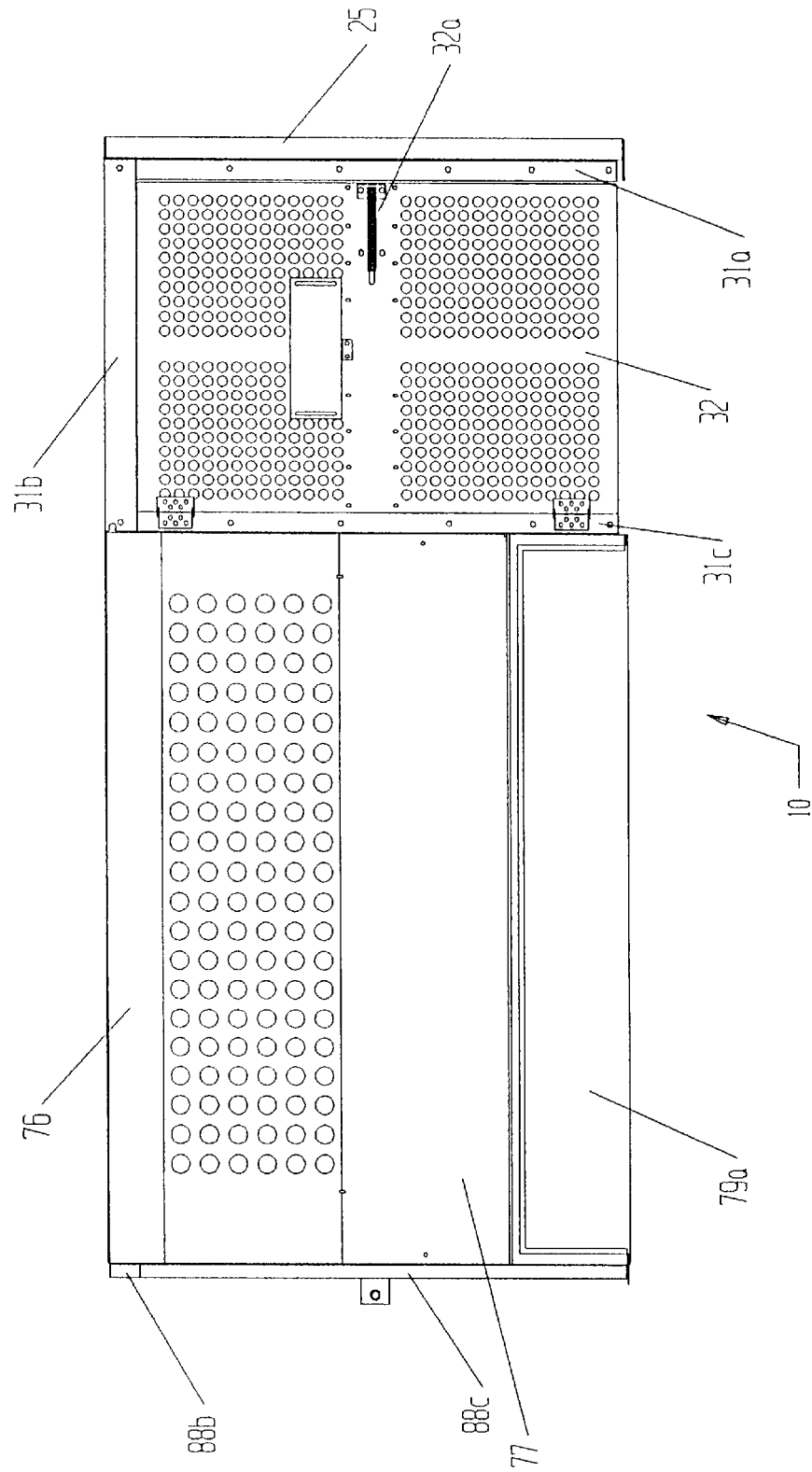
FIG. 3 is a right side elevation view of the two-compartment modular security enclosure.
Figure 4:
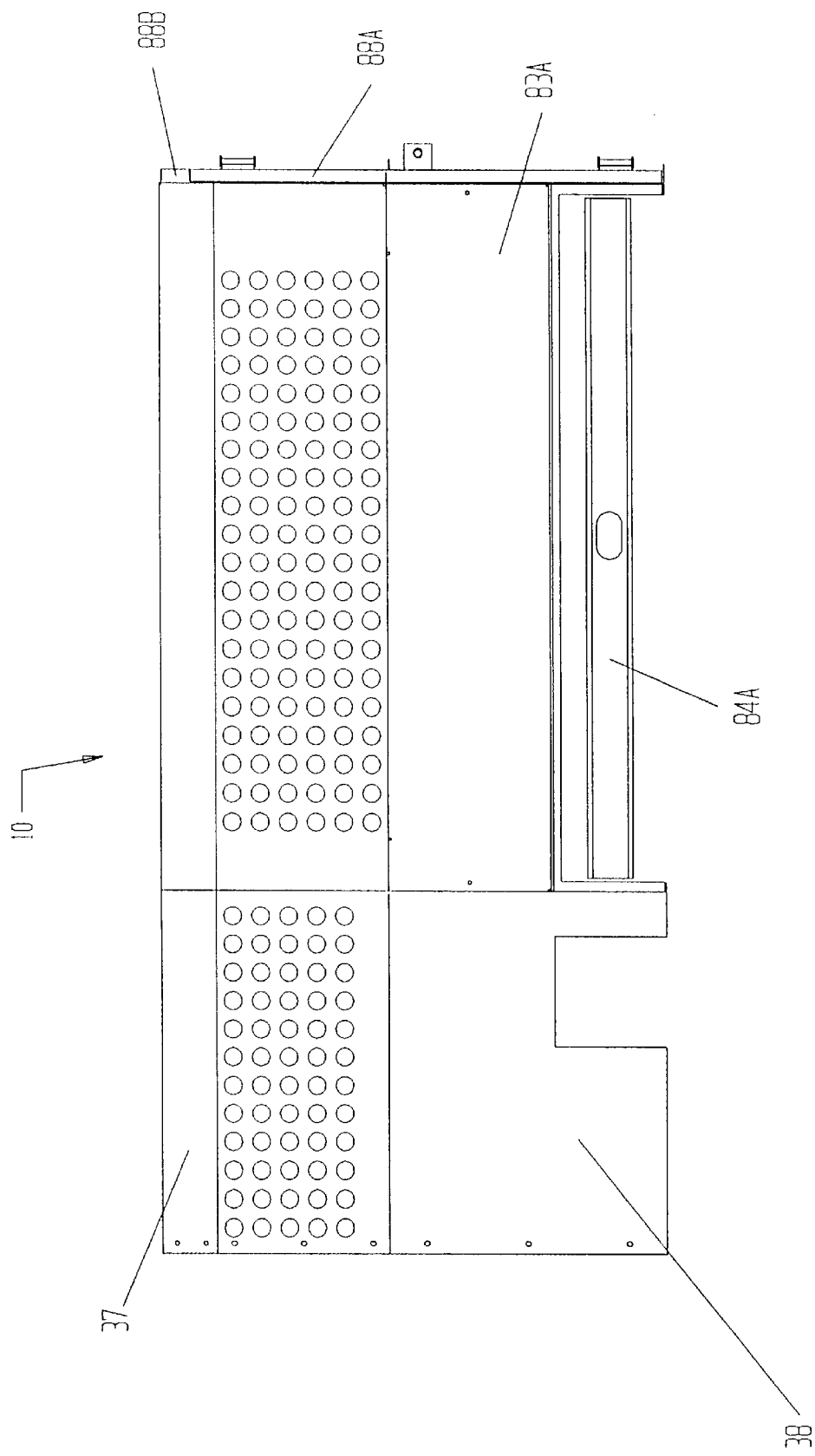
FIG. 4 is a left side elevation view of the driver's side of the two-compartment modular security enclosure.
Figure 5:
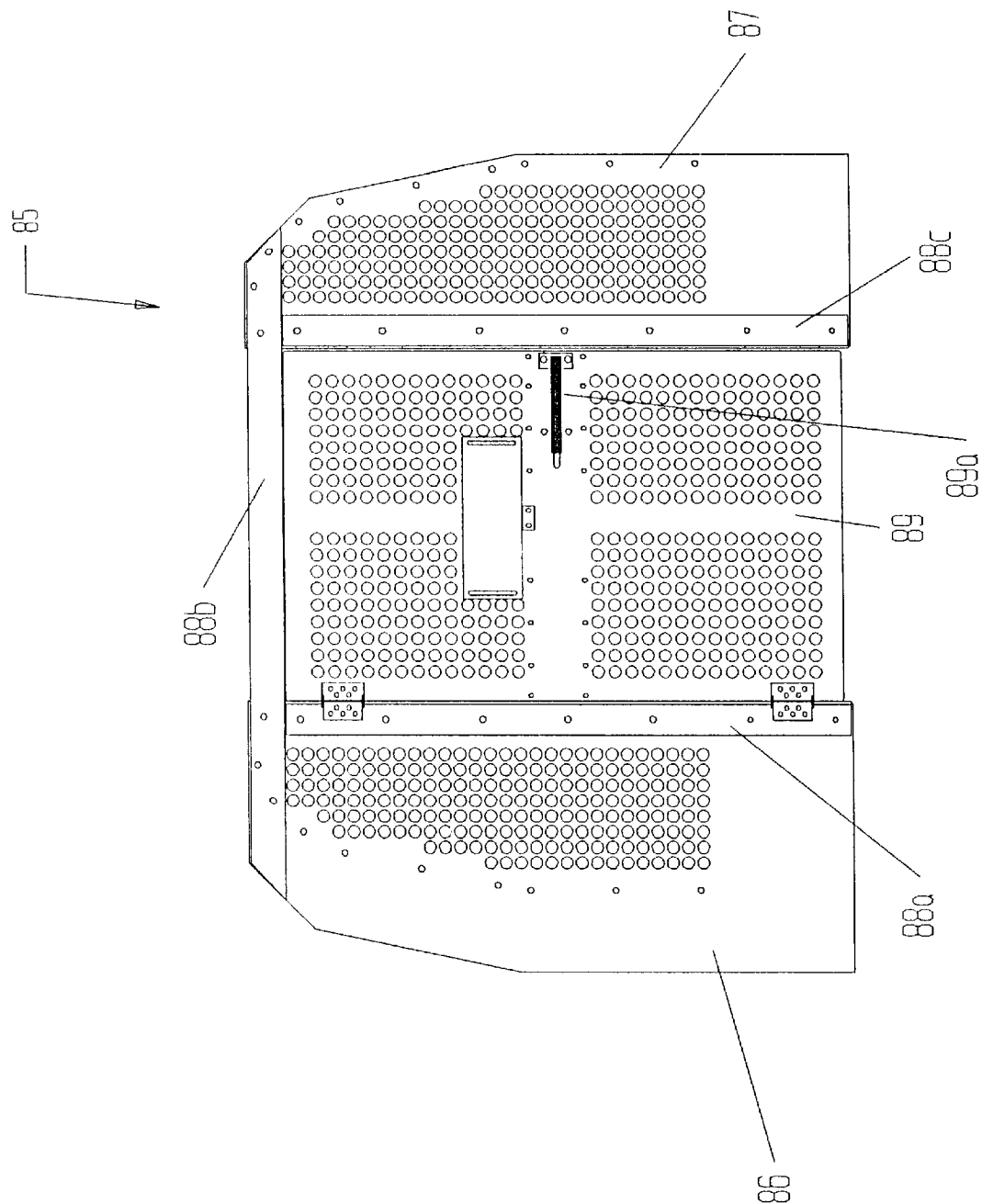
FIG. 5 is a rear elevation view of the rearward wall of the rearward compartment of the two-compartment modular security enclosure.
Figure 6:
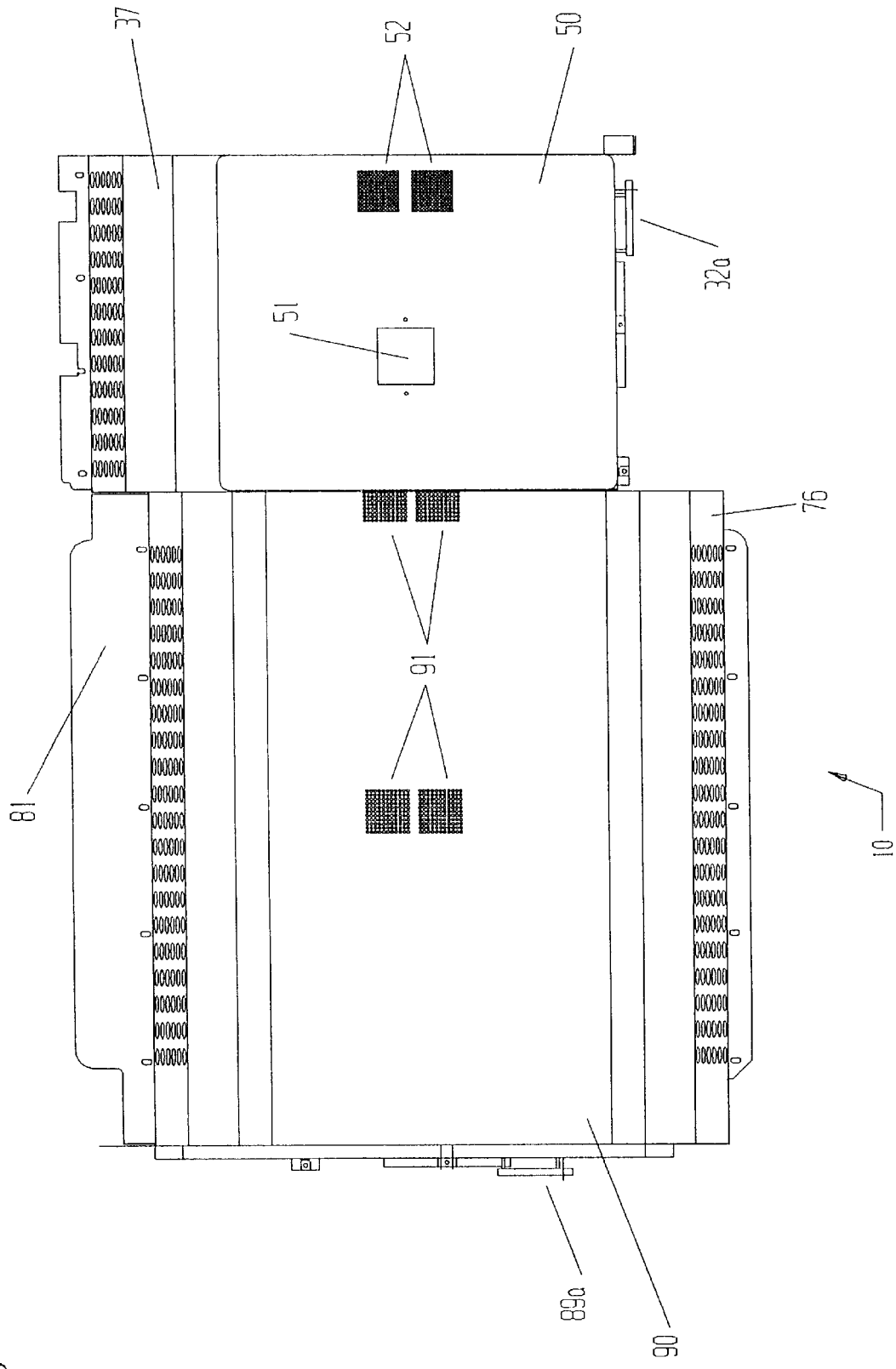
FIG. 6 is a top plan view of the two-compartment modular security enclosure.

With reference to the drawings, particularly to FIGS. 1 through 6, the removable modular security enclosure is indicated generally by the numeral 10 and shown in an embodiment comprising two separate compartments. The security enclosure 10 includes a forward compartment indicated generally by the numeral 20 and a rearward compartment indicated generally by the numeral 65. Forward compartment 20 and rearward compartment 65 each comprise four walls and a roof panel which are all interconnected.

The Forward Compartment

Figure 7:
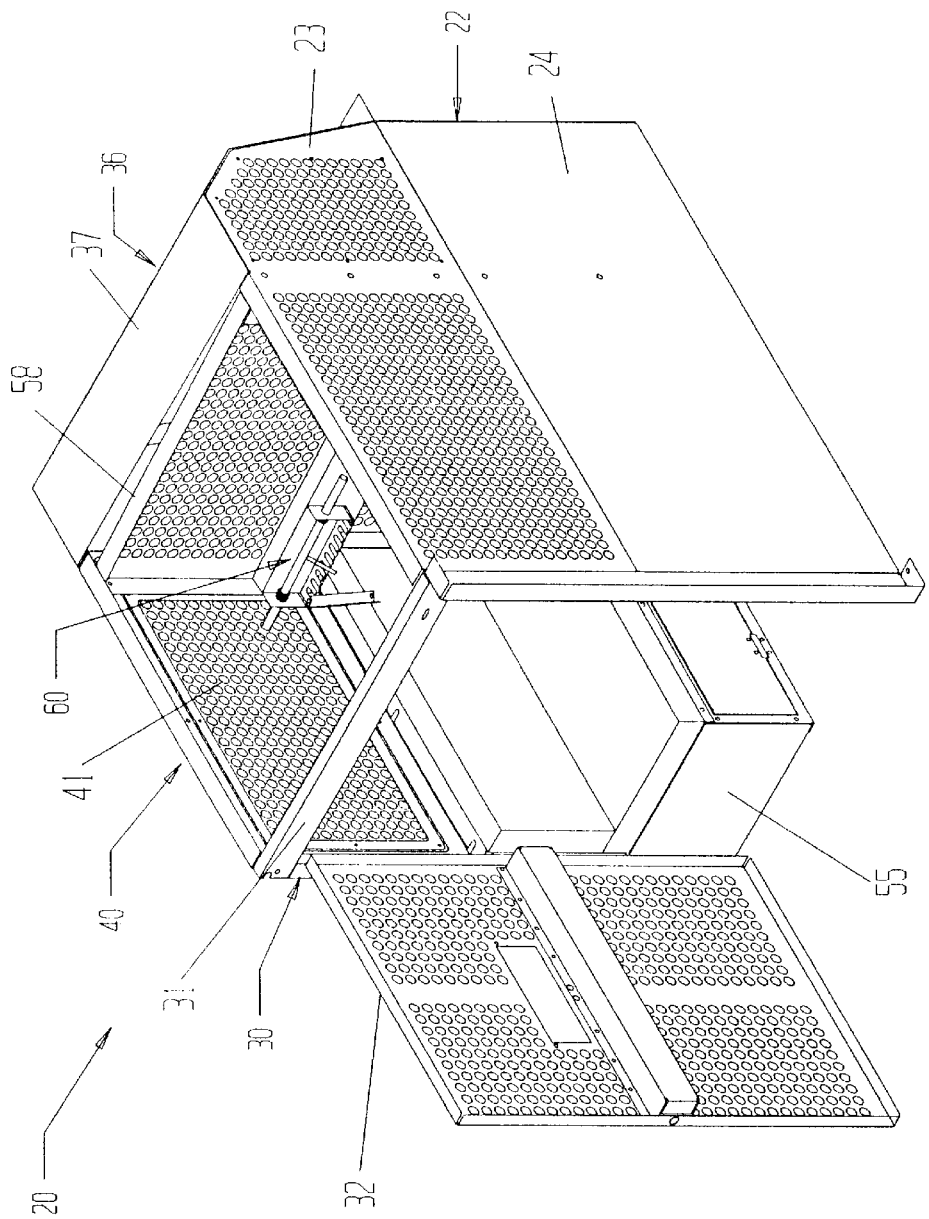
FIG. 7 is a perspective view of the forward compartment with the top removed.
Figure 8:
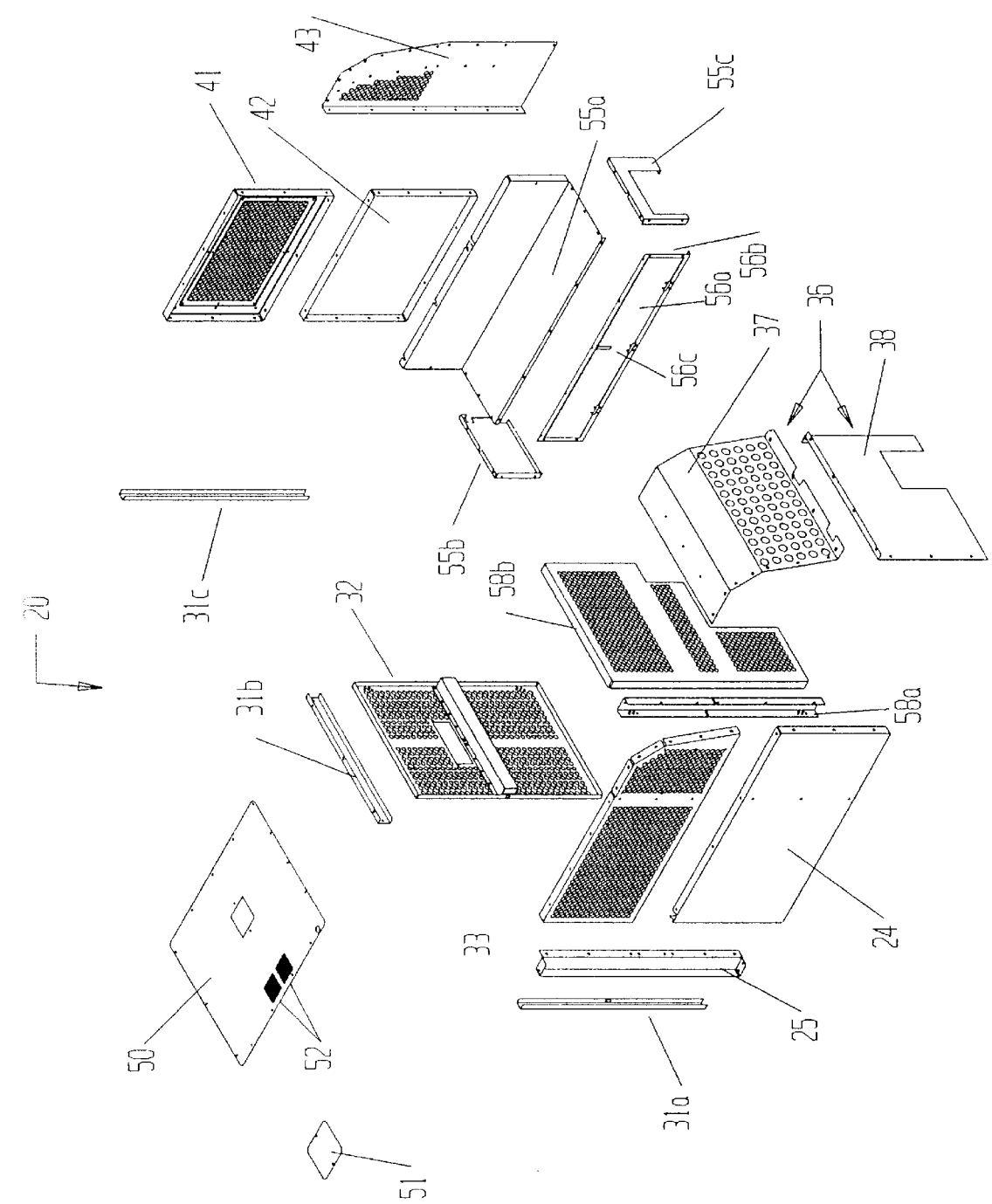
FIG. 8 is an exploded view of the forward compartment of the two-compartment modular security enclosure illustrating the spatial relationship of the components in the assembly.

As shown in FIGS. 7 and 8, the forward compartment 20 consists of a forward wall 22, a passenger's side door, a driver's side wall 36, a rearward wall 40, and a roof panel 50. The forward compartment 20 includes a bench 55 and an adjustable vertical partition 58. The bench 55 extends along the length of the rearward wall 40. The partition 58 divides the forward compartment into two smaller subcompartments. The space between the driver's side wall 36 and the adjustable vertical partition 58 forms a "violent prisoner" compartment. A violent prisoner may be isolated in this compartment and the adjustable vertical partition 58 adjusted such that the prisoner has minimal space for movement. The adjustable vertical partition 58 is locked in place by the dead bolt locking device 60. Securing the adjustable vertical partition 58 to contain a prisoner within the violent prisoner compartment allows the remainder of the forward compartment 20 to be used for the transport of other prisoners.

The forward wall 22 includes a top panel 23 and a bottom panel 24, both with inwardly extending flanges on all four sides. These panels both extend horizontally across the van from the driver's side wall 36 to the passenger's side vertical brace 25. The top panel 23 and the bottom panel 24 are attached, by fasteners, along adjacent horizontal flanges. When these panels are joined, the forward wall 22 extends vertically from the floor of the van to the roof panel 50. The forward wall 22 is also attached by fasteners to the vertical brace 25. The driver's side of the forward wall 22 is shaped to conform to the cross-section of the driver's side wall 36. In addition, the top panel 23 is perforated to facilitate visibility through the panel.

The passenger's side wall 30 includes an access door which aligns with a sliding door on the passenger side of a van. The access door includes a gate frame 31 and a gate 32. The gate frame 31, in turn, includes three sections: the forward wall frame member 31a, the upper frame member 31b, and the rearward wall frame member 31c. The forward wall frame member 31a extends vertically from the floor of the van and is attached to the vertical brace 25. The rearward wall frame member 31c extends vertically from the floor of the van and is attached to the vertical edge of the rearward wall 40. The upper frame member 31b extends horizontally from the top of the passenger's side vertical brace 25 to the top of the rearward wall 40 and is attached to both by fasteners.

The gate 32 is pivotally attached to the rearward wall frame member 31c and generally covers the area defined by the gate frame 31 and the floor of the van. The gate 32 includes an integral dead bolt mechanism 32a which interacts with an opening in the forward wall frame member 31a to secure the gate 32. Note that, if the gate frame 31 and the gate 32 do not comprise the entire passenger's side wall 30, then supplementary panels may be used where necessary to complete the wall 30.

The driver's side wall 36 includes a top panel 37 and a bottom panel 38, both of which extend horizontally from the forward wall 22 to the rearward wall 40. Flanges extend along the bottom edge and rearward edge of the top panel 37. Similarly, flanges extend along the top edge and rearward edge of the bottom panel 38. The top panel 37 and bottom panel 38 are attached by fasteners extending along the flanges. When the top panel 37 and bottom panel 38 are joined, the driver's side wall 36 extends vertically from the floor of the van to the roof panel 50.

The driver's side wall 36 is attached along its forward edge to the front wall 22 and along its rearward edge to the rear wall 40 by fasteners. The top panel 37 is perforated to facilitate visibility through the panel. In addition, the cross-section of the top panel 37 conforms to the contour of the side wall of the van. The bottom panel 38 has a slot in the lower edge to provide for passage of a heating duct into the forward compartment 20.

The rearward wall 40 includes a top panel 41, a bottom panel 42, and a driver's side vertical wing panel 43. The top panel 41 and the bottom panel 42 both have flanges along all four edges. The wing panel 43 has a flange along the edge that joins panels 41 and 42. The top panel 41, bottom panel 42, and wing panel 43 are attached by fasteners. When these panels are joined, the rearward wall 40 extends vertically from the floor of the van to the roof panel 50. The edge of the wing panel 43 is attached to the driver's side wall 36 and is shaped to conform to the contour of the wall 36. Both the top panel 41 and the driver's side vertical wing 43 are perforated to facilitate visibility through these panels.

Figure 12:
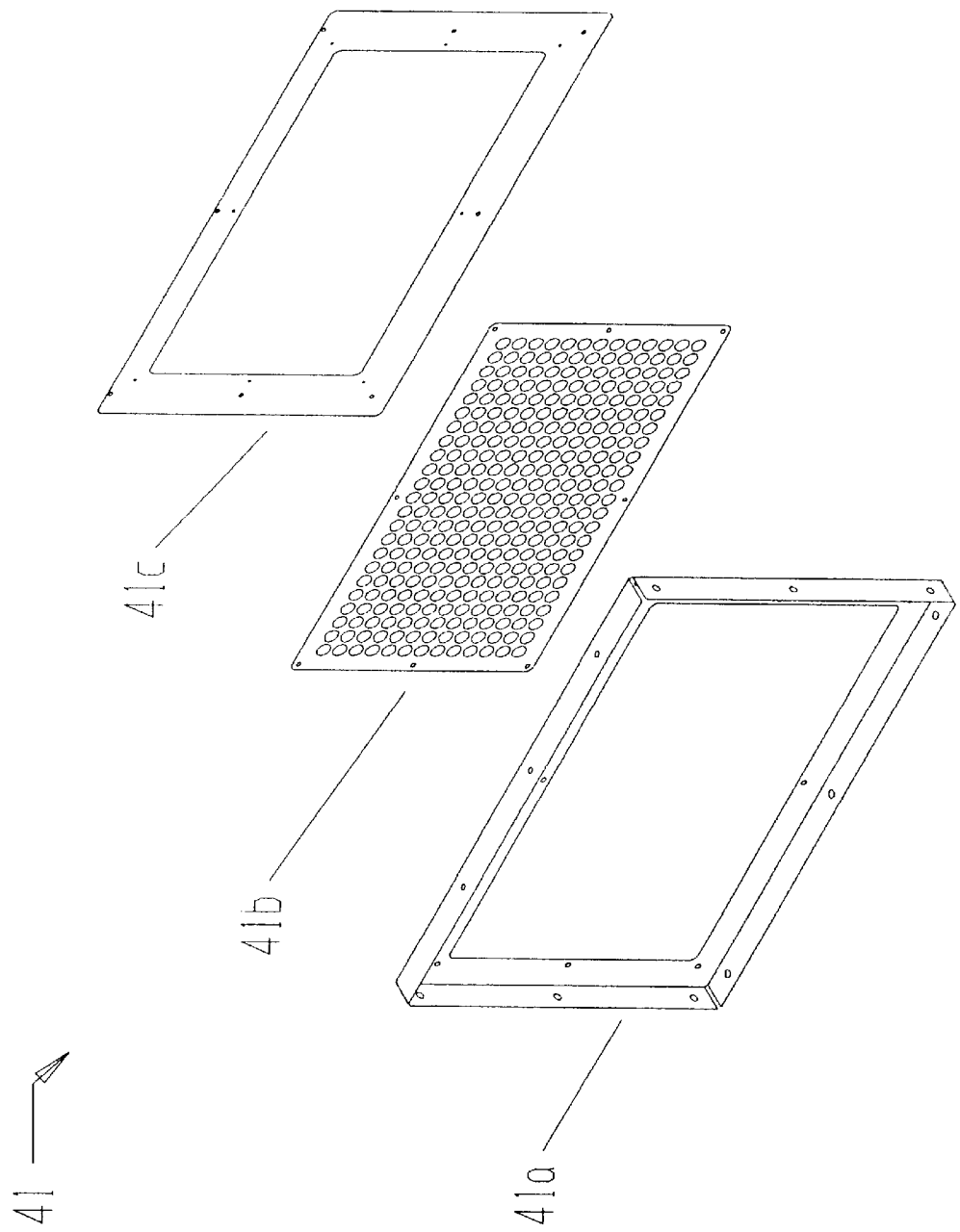
FIG. 12 is an exploded perspective view of the escape panel.

The top panel 41 of the rearward wall 40 may also be configured to enable removal of prisoners through either the forward compartment 20 or the rearward compartment 65 in the event of a emergency as shown in FIGS. 12 and 13. In this configuration, the top panel 41 consists of an outer frame 41a, an inner frame 41b, and an escape panel 41c. The escape panel 41c is attached to the inner frame 41b by fasteners. This assembly, in turn, is attached to the outer frame 41a by fasteners. The inner frame 41b, the panel 41c, and the fasteners are installed to allow removal of one or both of the components from either compartment. For instance, the inner frame 41b is mounted to the outer frame 41a from the rearward compartment 65 side. The heads of the fasteners securing the inner frame 41b are accessible from inside the rearward compartment 65. The panel 41c is then mounted to the inner frame 41b from the forward compartment 20 side. Here, the heads of the fasteners securing the panel 41c are accessible from inside the forward compartment 20. Thus, in the event of an emergency where egress from the forward compartment 20 is not possible, the fasteners securing the inner frame 41b can be removed from inside the rearward compartment 65. This removes both the inner frame 41b and the attached panel 41c. The forward compartment 20 occupants are then extracted through the outer frame 41a into the rearward compartment 65. On the other hand, if egress from the rearward compartment 65 is not possible, the fasteners securing the panel 41c can be removed from inside the forward compartment 20. The occupants of the rearward compartment 65 are then removed through the inner frame 41b into the forward compartment 20.

The roof panel 50 covers the area defined by the upper edges of the four walls comprising the sides of the forward compartment 20. The roof panel 50 is also attached at its extremes by fasteners. In addition, the roof panel 50 has a removable access port 51 and one or more integral grills 52 for air conditioning and ventilation of the forward compartment 20.

The bench 55 extends horizontally from the driver's side wall 40 to the passenger's side wall 30 and includes four sections: the seat 55a, the passenger's side panel 55b, the driver's side panel 55c, and the storage compartment door 56. The cross-section of the seat 55a forms a right angle where the horizontal surface is the seating surface and the vertical surface is the seat back. Both the passenger's side panel 55b and the driver's side panel 55c cover the area between the horizontal surface of the seat 55a and the floor of the van. However, the driver's side panel 55c also includes a slot in its lower edge which cooperates with the slot in the lower edge of the bottom panel 38 of the driver's side wall 36 to allow passage of a heating duct into the forward compartment 20. The storage door 56 covers the area between the forward edge of the horizontal surface of the seat section 55a and the floor of the van. The storage door 56 includes a door panel 56a, a frame 56b, and a locking mechanism 56c. The door panel 56a is horizontally and pivotally attached to the lower edge of the frame 56b and is securable at the upper edge of the frame 56b by the locking mechanism 56c. The door panel 56a also has an integral slotted grill 56d for heating and ventilation of the forward compartment 20. The seat 55a, the passenger's side panel 55b, the driver's side panel 55c, and the frame 56b of the storage door 56 are all interconnected by fasteners. The bench 55 is then attached, by fasteners, to the rearward wall 40 and the floor of the van at the contacting edges of the assembly.

The adjustable vertical partition 58 includes a forward wall frame section 58a and gate 58b. The forward wall frame section 58a is attached to the forward wall 22 and extends from the floor of the van to the roof panel 50. The gate 58b is pivotally attached to the forward wall frame section 58a. The gate 58b covers the area defined by the forward wall 22, the roof panel 50, the rearward wall 40, and the floor of the van, except for a cut-out for the bench 55. It is also perforated to facilitate visibility through the panel.

Figure 9:
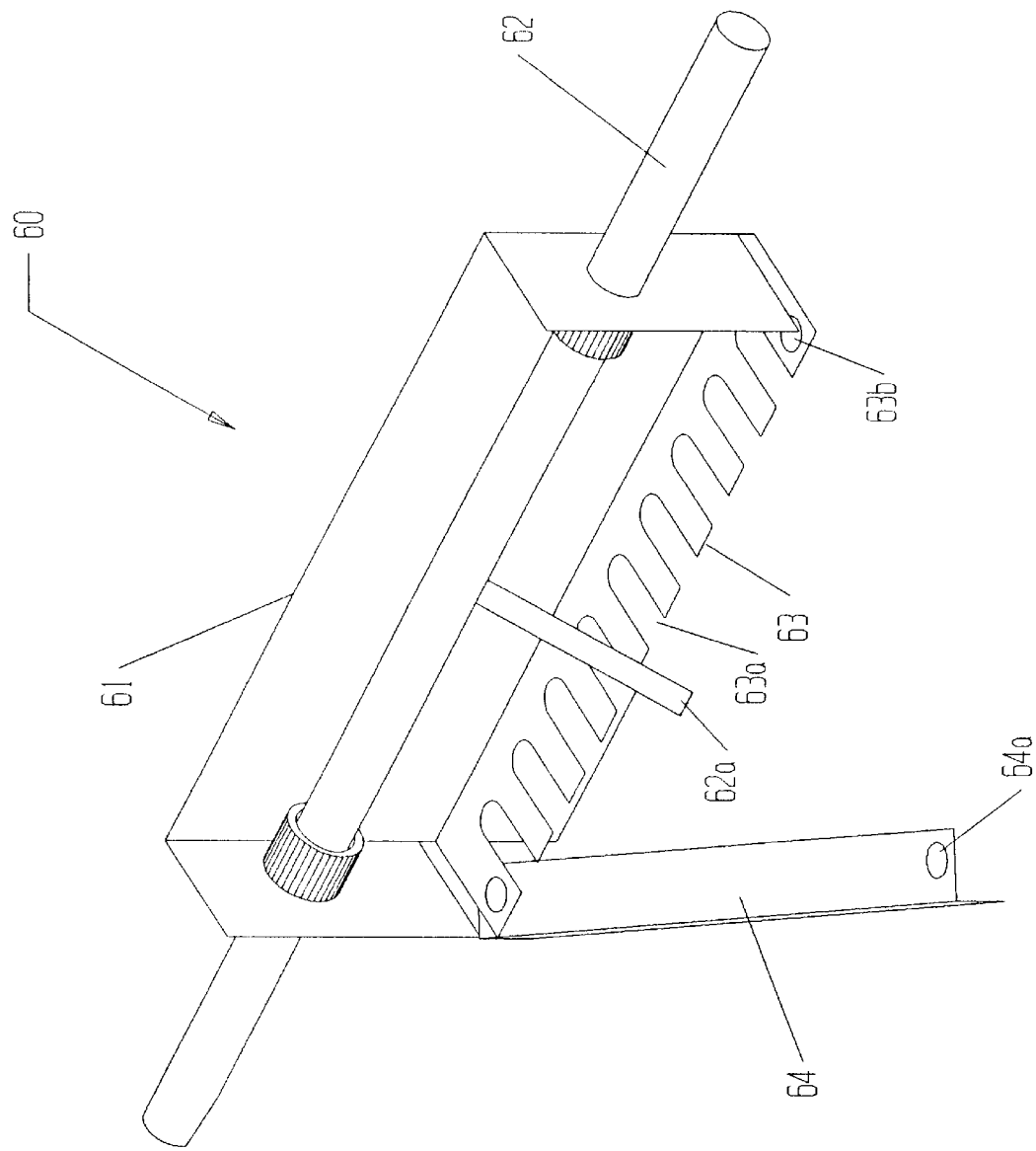
FIG. 9 is a perspective view of the dead bolt locking device used to secure the position of the adjustable vertical partition.

As specifically illustrated in FIG. 9, the gate 58b also includes an attached dead bolt locking device 60 which serves to secure the gate 58b by engaging one of the perforations in the top panel 41 of the rearward wall 40. The dead bolt locking device 60 comprises a bracket 61 and a sliding bolt 62. The bracket 61 is attached to the gate 58b by fasteners. The bolt 62 slides forwardly and rearwardly in the bracket 61. The bracket 61 includes a locking member 63 along the bottom having a series of slots 63a. The bolt 62 includes a handle 62a that engages in the slots 63a of the locking member 63 to prevent the bolt 62 from sliding. A locking bar 64 is pivotally attached at one end to the locking member. The forward end of the locking bar includes an aperture 64a which aligns with a similar aperture 63b in the locking member 63.

As previously explained, the bolt 62 slides within the bracket 61. To lock the gate, the bolt 62 is slid rearwardly until it engages one of the perforations in the top portion 41 of the rearward wall 40. The bolt 62 is then rotated so that the handle 62b engages one of the slots in the locking member. When the handle 62b is engaged with a slot 63a of the locking mechanism 63, the sliding bolt 62 is locked in position. Once the handle is engaged with the locking member, the locking bar is secured in place with a padlock to prevent the withdrawal of the handle from the slot in the locking member. One advantage of the present invention is that the gate 58b can be secured in a plurality of different positions by engaging the bolt 62 with different perforations in the top panel 41 of the rearward wall 40. This feature allows for some adjustment to accommodate prisoners of different size.

The Rearward Compartment

Figure 10:
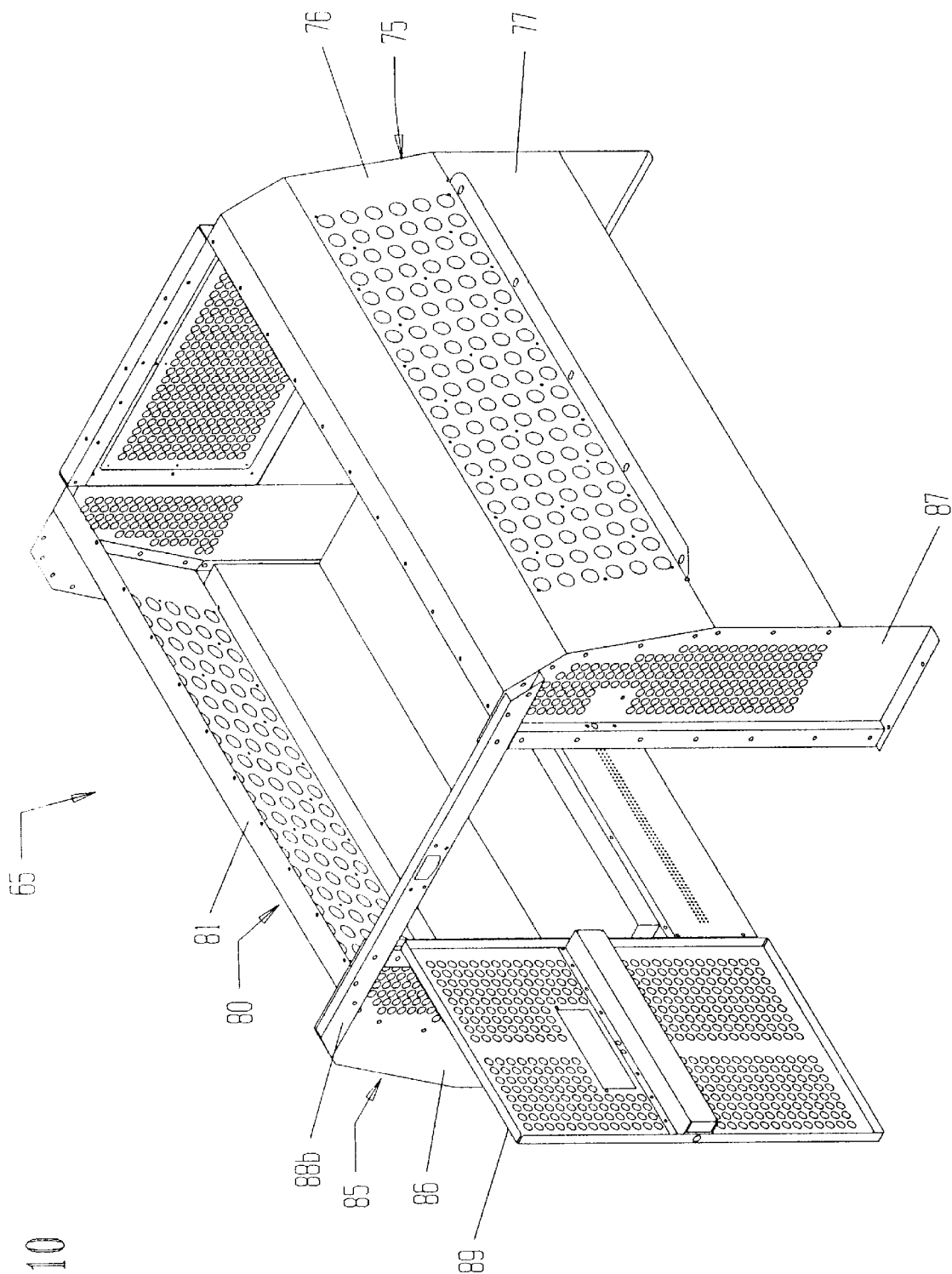
FIG. 10 is a perspective view of the rearward compartment with the top removed.
Figure 11:
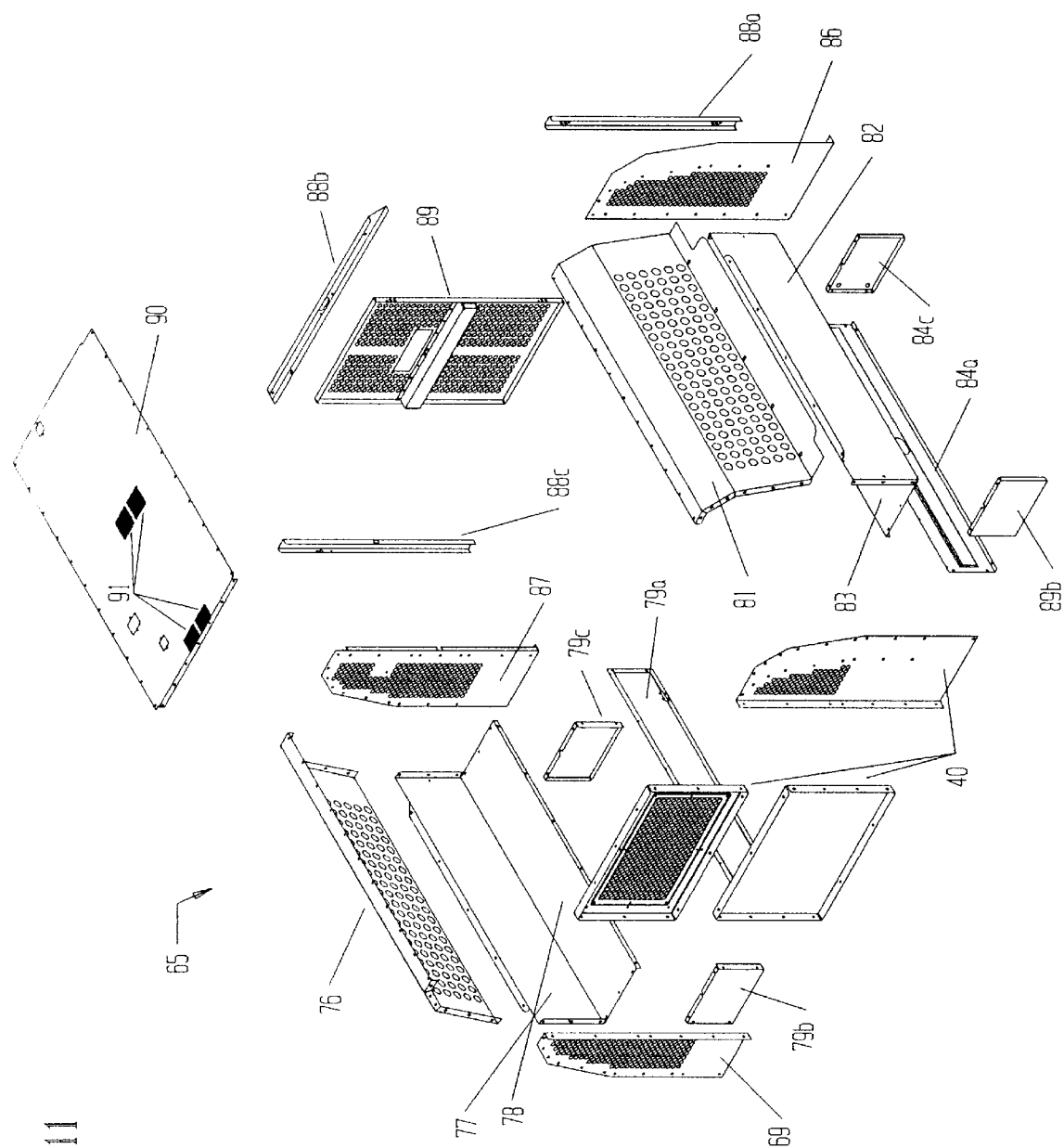
FIG. 11 is an exploded view of the rearward compartment of the two-compartment modular security enclosure illustrating the spatial relationship of the components in the assembly.

As shown in FIGS. 10 and 11, the rearward compartment 65 consists of a forward wall 40 (which is also the rearward wall of the forward compartment 20), a passenger's side wall 75, a driver's side wall 80, a rearward wall 85, and a roof panel 90.

The passenger's side wall 75 includes a top panel 76 and a bottom panel 77. The top panel 76 includes a flange along its lower edge which joins with a flange along the upper edge of the bottom panel 77. The top panel 76 and the bottom panel 77 are held together by fasteners that extend through the adjoining flanges. A seat panel 78 extends horizontally from the lower end of the bottom panel 77 to form a bench seat inside the rearward compartment. The seat panel 78 and bottom panel 77 are formed from a single piece of sheet metal bent at a 90° angle. A kick panel 79a extends downward from the edge of the seat panel 78 to the floor of the van. End panels 79b, 79c extend downward from each end of the seat panel 83 to the floor of the van. The seat panel 83 is fastened to horizontal flanges along the top edge of the end panels 79b, 79c. The kick panel 79a and end panels 79b, 79c provide support for the seat panel 78 and are attached to the floor of the van by fasteners that extend through horizontal flanges along the bottom edge of the panels. In a preferred embodiment, the kick panel 79a is hinged along its lower edge to allow access to the space beneath the bench.

The driver's side wall 80 is made in a similar fashion as the passenger's side wall 75. The driver's side wall 80 includes a top panel 81 and bottom panel 82. The top panel 81 includes a flange along its lower edge which joins with a flange along the upper edge of the bottom panel 82. The top panel 81 and bottom panel 82 are joined by fasteners which extend through the adjoining flanges. A seat panel 83 extends horizontally from the lower end of the bottom panel 82 to form a bench seat inside the rearward compartment. The bottom panel 82 and seat panel 83 are formed from a single piece of sheet metal bent at a 90° angle. A kick panel 84a extends downward from the front edge of the seat panel 83. End panels 84b, 84c extend downward from the ends of the seat panel 82. The kick panel 84a and end panels 84b, 84c provide support for the seat panel 82. The upper edge of the kick panel 84a is fastened to a downwardly extending flange on the seat panel 82. The seat panel 82 is also fastened to horizontal flanges along the top edge of the end panels 84b, 84c. The kick panel 84c, and end panels 84b, 84c all include horizontal flanges along their lower edges to fasten the sidewall 80 to the floor of the van.

The rearward wall 85 generally includes a driver's side vertical wing panel 86, a passenger's side vertical wing panel 87 and an access door which aligns with the rear door of a passenger van. The access door includes a gate frame 88 and a gate 89. The gate frame 88 includes three sections: the driver's side frame member 88a, the upper panel frame member 88b, and the passenger's side frame member 88c. The driver's side frame member 88a extends from the floor of the van to the roof panel frame member 88b and is attached to the vertical edge of the driver's side wing panel 86 by fasteners. The upper panel frame member 88b extends across the width of the van and is fastened to the wing panels 86 and 87 by fasteners. The passenger's side frame member 88c extends from the floor of the van to the roof panel frame member 88b and is attached to the passenger's side wing panel 87 by fasteners. The gate 89 is pivotally attached to the driver's side frame member 88a and generally covers the area defined by the gate frame 88. The gate 89 includes an integral horizontal sliding dead bolt mechanism 89a which interacts with a door stop on the passenger's side frame member 88c to secure the gate 89.

The upper frame member 88b may optionally be constructed to permit the installation of a video surveillance system for the rearward compartment 65. Here, a semi-opaque panel is installed on the side of the upper frame member 88b facing the interior of the rearward compartment 65. A close-circuit video camera is then installed in the upper frame member 88b, facing into the rearward compartment 65, behind the semi-opaque panel. The semi-opaque panel is used to conceal the actual location of the camera from the occupants of the rearward compartment 65. The images provided by the video camera are then displayed on a monitor located adjacent to the driver's seat of the van. Note further that, since the security enclosure 10 impedes the view of the driver out of the rear of the van, another video camera may be attached to the rearward wall 85 of the rearward compartment 65 facing through the rear window of the van. This second camera is used for surveillance of the area behind the van. The driver may then select the images from either camera for viewing on the monitor.

The driver's side wing panel 86 extends vertically from the floor of the van to the roof panel 90 and horizontally from the driver's side wall 80 to the driver's side frame member 88a of the gate frame 88. The driver's side wing panel 86 is fastened to a flange located along the rear edge of the drivers' side wall 80. The driver's side panel also includes a flange along its lower edge to fasten it to the floor of the van. The driver's side wing panel 86 is perforated to facilitate visibility through the panel. In addition, the edge of the driver's side wing panel 86 fastens to the top panel 81 of the driver's side wall 80 and conforms to the cross-section of the top panel 81.

The passenger's side wing panel 87 of the rearward wall 85 extends vertically from the floor of the van to the roof panel 90 and horizontally from the passenger's side frame member 88c of the gate frame 88 to the passenger's side wall 80. The passenger's side wing panel 87 is fastened to a flange located along the rear edge of the passenger's side wall 75. The passenger's side wing panel 87 also has a flange along its lower edge to fasten it to the floor of the van. The passenger's side wing panel 87 is perforated to facilitate visibility through the panel. In addition, the edge of the passenger's side wing panel 87 attached to the top panel 76 of the passenger's side wall 75 conforms to the cross-section of the top panel 76. The lower edge of the passenger's side wing panel 87 fastens to the bottom panel 77.

The same components which form the rearward wall of a forward compartment also form the forward wall of the rearward compartment with the addition of the passenger's side wing panel 69. The passenger's side wing panel 69 attaches to a flange located along the forward edge of the passenger's side wall 75. The passenger's side wing panel 69 also includes a flange which attaches to panels 41 and 42.

The roof panel 90 covers the area defined by the upper edges of the four walls comprising the sides of the rearward compartment 65 and is attached at the extremes by fasteners. The roof panel 90 also has one or more integral grills 91 for air conditioning and ventilation of the rearward compartment 65.

For purposes of practicing the present invention, any suitable type of fasteners can be used. In the preferred embodiment, safety screws and nuts are used to secure the various components together. It is also within the scope of the present invention to construct some other panels such that the panels mechanically interlock with one another. One type of mechanical interlock which could be used are interlocking slots and tabs.

The modular construction of the present invention facilitates the assembly and disassembly of the enclosure within the cargo area of the van. The components can be assembled in place to form a semi-permanent structure. One advantage of the present invention is that it allows the enclosure to be disassembled and removed in the event that the vehicle is damaged or taken out of service. The enclosure of the present invention also includes several novel features, such as the violent inmate compartment and the emergency escape panel.

The present invention provides a means of outfitting widely available transport vans with an apparatus for the secure containment and transportation of prisoners. Sectional construction and the use of fasteners or other interlocking devices to interconnect the components also provides a non-permanent and reusable containment structure. Thus, the present invention is cost-effective in that specialized prisoner transport vehicles do not have to be purchased by the user; an ordinary commercially available passenger van is sufficient. Furthermore, if the van has been wrecked or once the service life of the van has been reached, the structure may be removed and installed in another van. Finally, the sectional construction facilitates modifications of selected components and customization of the structure to meet the requirements of different situations.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended claims are intended to be embraced therein.

What is claimed is:

1. A removable modular security enclosure for securing prisoners in the cargo area of transport vans, comprising:

a) a rearward compartment comprising a plurality of walls and a roof panel which are detachably secured to one another, wherein at least one of said walls includes an access door;

b) a forward compartment comprising a plurality of walls and a roof panel which are detachably connected to one another, wherein said forward compartment shares at least one wall with said rearward compartment, and wherein at least one of said walls includes an access door;

c) an adjustable partition for dividing said forward compartment into two smaller subcompartments; and d) a locking device for securing the adjustable partition in a fixed position.

2. The removable modular security enclosure of claim 1 further including a bench integral with a wall of the rearward compartment.

3. The removable modular security enclosure of claim 1 further including a bench integral with a wall of the forward compartment.

4. The removable modular security enclosure of claim 1 wherein the locking device comprises a dead bolt attached to the adjustable partition which engages a wall of the forward compartment to secure the adjustable partition in a fixed position.

5. The removable modular security enclosure of claim 1 further including an escape panel in the wall shared by the forward and rearward compartments to allow persons in either compartment to exit through the other compartment when the access door to the compartment is blocked.

6. The removable modular security enclosure of claim 5 wherein said escape panel includes an outer frame secured to said shared wall, an inner frame secured to said outer frame, and a central panel secured to said inner frame.

7. A removable modular security enclosure for securing prisoners in the cargo area of transport vans, comprising:

a) a rearward compartment comprising a plurality of walls and a roof panel, wherein at least one of said walls includes an access door;

b) a forward compartment comprising a plurality of walls and a roof panel, wherein at least one of said walls includes an access door;

c) a dividing wall disposed between said forward and rearward compartments; and d) a removable escape panel in the dividing wall and removable from either side of said dividing wall to allow persons in either compartment to exit through the other compartment when the access door to the compartment is blocked.

8. The removable modular security enclosure of claim 7 further including an adjustable partition in said forward compartment dividing the forward compartment into two smaller subcompartments.

9. The removable modular security enclosure of claim 9 further including a locking mechanism for securing the adjustable partition in a fixed location.

10. The removable modular security enclosure of claim 9 wherein the locking mechanism comprises a dead bolt attached to the adjustable partition which engages a wall of the forward compartment to secure the adjustable partition in a fixed position.

11. The removable modular security enclosure of claim 7 further including a bench integral with a wall of the rearward compartment.

12. The removable modular security enclosure of claim 7 further including a bench integral with a wall of the forward compartment.

13. The removable modular security enclosure of claim 7 further including a first mounting frame releasably connected to said escape panel by a first set of fasteners, a second mounting frame releasably connected to said first mounting frames, by a second set of fasteners, wherein said first and second sets of fasteners are accessible from different compartments on either side of said shared wall.

14. A removable modular security enclosure for securing prisoners in the cargo area of transport vans, comprising:
   a) a plurality of walls and a roof panel which are detachably secured to one another to define a prisoner transport compartment;
   b) an access door in at least one wall of said security enclosure;
   c) an adjustable partition for dividing said prisoner transport compartment into two subcompartments; and
   d) a locking device for securing the adjustable partition in a fixed position.

15. The removable modular security enclosure of claim 14 further including an escape panel in at least one of said walls.

* * * * *